(12) United States Patent
Takeuchi et al.

(10) Patent No.: US 6,200,033 B1
(45) Date of Patent: Mar. 13, 2001

(54) HYDRODYNAMIC GAS BEARING AND MANUFACTURING METHOD THEREOF

(75) Inventors: Hisao Takeuchi; Kaoru Murabe, both of Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/327,251

(22) Filed: Jun. 7, 1999

(30) Foreign Application Priority Data

Jun. 12, 1998 (JP) .................................................. 10-165368

(51) Int. Cl.$^7$ ...................................................... F16C 32/06
(52) U.S. Cl. .............................................................. 384/115
(58) Field of Search .................................... 384/114, 115, 384/118, 119, 120

(56) References Cited

U.S. PATENT DOCUMENTS

| | | |
|---|---|---|
| 5,019,738 | 5/1991 | Weilbach et al. . |
| 5,181,783 | 1/1993 | Sherman et al. . |
| 5,628,567 | 5/1997 | Murabe et al. . |
| 5,713,670 * | 2/1998 | Goldowsky ........................ 384/115 |

FOREIGN PATENT DOCUMENTS

| | | |
|---|---|---|
| 0837257 | 4/1998 | (EP) . |
| 58-163818 | 9/1983 | (JP) . |
| 58-224324 | 12/1983 | (JP) . |
| 61-201916 | 9/1986 | (JP) . |
| 1-200320 | 8/1989 | (JP) . |
| 3-204411 | 9/1991 | (JP) . |
| 5-79510 | 3/1993 | (JP) . |
| 5-1960031 | 8/1993 | (JP) . |
| 7-230056 | 8/1995 | (JP) . |
| 8-312639 | 11/1996 | (JP) . |
| 9-264317 | 10/1997 | (JP) . |
| WO97/41362 | 11/1997 | (WO) . |

OTHER PUBLICATIONS

Article Entitled "Gas Bearing" by Shinichi Tohgo; published by Kyoritsu Shuppan et al. (1984).

* cited by examiner

*Primary Examiner*—Dirk Wright
(74) *Attorney, Agent, or Firm*—W. F. Fasse; W. G. Fasse

(57) ABSTRACT

A hydrodynamic gas bearing structure which can effectively prevent the half speed whirl phenomenon and prevent wear at the time of activation or stopping of rotation is implemented in a simple manner. The hydrodynamic gas bearing includes a shaft body having an outer periphery, and a cylindrical bearing body arranged around the shaft body with a space maintained therebetween in the radial direction. The shaft body has a hollow portion extending in the axial direction. In a cross section perpendicular to the axial line of the shaft body, the hollow portion has a not-complete-round, symmetrical shape with respect to a line passing through the center of the cross section, for example, an approximately regular triangular shape. A first distance from the center of the cross section to an outline corresponding to an inner periphery of the hollow portion changes along the peripheral direction of the shaft body as a second distance from the center of the cross section to an outline corresponding to the outer periphery of the shaft body also changes along the peripheral direction of the shaft body.

9 Claims, 5 Drawing Sheets

HYDRODYNAMIC GAS BEARING AND MANUFACTURING METHOD THEREOF

BACKGROUND INFORMATION

1. Field of the Invention

The present invention generally relates to a hydrodynamic gas bearing and manufacturing method thereof.

More particularly, the present invention relates to a hydrodynamic gas bearing supporting a rotator rotating at a high speed and a manufacturing method thereof.

2. Description of the Background Art

Recently, high rotational accuracy as well as high rotational speed have been required of a rotation driving part of a magnetic recording apparatus, for example, a hard disk driver. It has been desired to drive a spindle motor constituting the apparatus mentioned above at high rotation speed and high rotational accuracy. Conventionally, a ball bearing has been used for the bearing part of the motor. The ball bearing, however generally has a short life in a range of high speed rotation exceeding 10000 rpm, and therefore it has been difficult to attain high rotational accuracy. In order to solve this problem, a so-called hydrodynamic oil bearing using oil as a lubricant has been studied. Even when the hydrodynamic oil bearing is used, however, satisfactory performance is not ensured, as the bearing suffers from the problem of oil leakage or the like.

A gas bearing has been known as a bearing allowing high speed rotation, in which a shaft body and a bearing body are supported in non-contact manner by means of gas such as air. The gas bearing is divided into a hydrostatic gas bearing separately provided with an apparatus for compressing gas, in which the shaft body and the bearing body are supported in non-contact manner by a floating force obtained by the pressure from gas compression, and a hydrodynamic gas bearing in which the shaft body and the bearing body are supported in non-contact manner by a floating force obtained by a pressure derived from an air flow generated by the rotation of the shaft body or the bearing body itself.

The hydrostatic gas bearing supports stable rotation from low speed to high speed. The hydrostatic gas bearing, however, requires a compressing apparatus separate from the body, which means that manufacturing cost is high.

By contrast, in principle, the hydrodynamic gas bearing can be manufactured at a low cost. When the hydrodynamic gas bearing is used, however, a phenomenon called "half speed whirl", which is an unstable vibration, can be sometimes observed at a high speed rotation (see, for example, *Gas Bearing* by Shinichi Tohgo, Kyoritsu Shuppan (1984)). This phenomenon is such that the shaft is pressed against the bearing surface by centrifugal force to whirl at a frequency of a half number of rotation in the interior of the bearing. When this phenomenon occurs, rotational accuracy degrades at a high speed rotation, and at a low speed rotation, the shaft body and bearing body rotate in contact with each other even in a range of relatively high number of rotation, resulting in wear and shorter life.

In view of these problems, as a method of suppressing the half speed whirl phenomenon at high speed rotation, use of a so-called herringbone bearing, that is, a bearing having V shaped grooves formed on a surface of the shaft body or the bearing body has been proposed. Manufacturing of the herringbone bearing, however, requires complicated and precise processing, which leads to higher manufacturing cost.

Further, as a method of suppressing the half speed whirl phenomenon at a high speed rotation, there is a proposal to make the shape of an outer periphery of a cross section of the shaft body to an approximately triangular shape with rounded corners (see Japanese Patent Laying Open-No. 9-264317, International Publication W097/41362, and so on). The cross section of the shaft body with outer periphery emphasized is shown in FIG. 6. As can be seen from FIG. 6, the shape of the outer periphery of shaft body 101 is deviated from a complete round 100. In FIG. 6, the deviation between the complete round 100 and the outline representing the shaft body 101 is emphasized for easier understanding. Processing of the outer periphery of the shaft body under control to provide an approximately triangular rather than a circular cross sectional shape requires higher manufacturing cost.

Further, in order to suppress the half speed whirl phenomenon at a high speed rotation, formation of a groove extending parallel to the axial line on the outer periphery of the shaft body (hereinafter referred to a "longitudinal groove") has been proposed (see Japanese Patent Laying-Open No. 58-163818, for example). It is possible to form the longitudinal groove at a low manufacturing cost and it is very effective to suppress the half speed whirl phenomenon at a high speed rotation. For example, longitudinal grooves are formed on the outer peripheral surface of the shaft body as shown in FIG. 7. As can be seen from FIG. 7, longitudinal grooves 102 are formed extending in the direction of the axial line on the outer peripheral surface of shaft body 101.

There arises a problem, however, that if the cross sectional shape of the shaft body is not a complete round, "floating rotational number" increases extremely dependent on the relation between the cross sectional shape and the positions of the grooves formed on the outer peripheral surface of the shaft body.

Here, "floating rotation number" refers to the number of rotation at the time when the shaft body and the bearing body transition from a contact state to a non-contact state as the rotation of the shaft body or the bearing body is started, or the number of rotation at a time when the shaft body and the bearing body transition from the non-contact state to a contact state as the speed of rotation is reduced from the high speed, normal rotating state to stop rotation. Thus, there has been such a problem that it is impossible to switch between the contact state and the non-contact state of the shaft body and the bearing body at a low number of rotation, which means that the shaft body and the hearing body are kept in contact with relatively high number of rotation at the start or stop of rotation, resulting in wear and shorter life.

FIG. 8 represents a cross section of the hydrodynamic gas bearing suffering from the above described phenomenon, in emphasized manner. As can be seen from FIG. 8, shaft body 101 has a non-circular, approximately triangular cross sectional shape. The outer periphery of shaft body 101 has three protruding portions a1, a2 and a3. Further, longitudinal grooves 102a, 102b and 102c are formed on the outer periphery of shaft body 101. A cylindrical bearing body 200 is arranged around the outer periphery of shaft body 101 having such a cross sectional shape, with a space in radial direction therebetween.

The outline representing the cross sectional shape of shaft body 101 circumscribes a completely round circumcircle 100a and inscribes a completely round incircle 100b. Here it is assumed that deviation δ between the circumcircle 100a and incircle 100b of the outline representing the cross sectional shape of shaft body 100, that is, out-of-roundness is about 0.2 μm. Even when the cross sectional shape of shaft body 101 has this very small out-of-roundness, the floating rotational number increases extremely high when bearing body 200 is rotated in a direction presented by the arrow R, causing wear and resulting in shorter life.

The reason for this is that longitudinal grooves 102c, 102b and 102a are positioned behind respective protruded portions a1, a2, and a3 of shaft body 101 with respect to the direction of rotation R of bearing body 200. In the conventional structure of the hydrodynamic gas bearing, it has been difficult to form longitudinal grooves on the outer periphery of the shaft body with the position of the longitudinal grooves not in the above described relation with the position of the protruding portions in its cross section if the cross sectional shape of the shaft body is not a complete round. In order to form the longitudinal grooves on the outer periphery of the shaft body to satisfy the prescribed relation, very high processing accuracy must be ensured, which leads to higher manufacturing cost.

SUMMARY OF THE INVENTION

Therefore, an object of the present invention is to solve the above described problems and to implement in a simple manner, a structure of a hydrodynamic gas bearing which effectively prevents the half speed whirl phenomenon and prevents wear at the time of starting and stopping rotation.

The hydrodynamic gas bearing in accordance with the present invention includes a shaft body having an outer periphery, and a cylindrical bearing body arranged so as to be spaced in a radial direction around the shaft body. The shaft body has a hollow portion extending in the axial direction. In a cross section vertical or perpendicular to the axial line of the shaft body, the hollow portion has a not-complete-round shape which is line-symmetrical with respect to a line passing through the is center of the cross section. In the cross section vertical or perpendicular to the axial line of the shaft body, as a first distance from the center of the cross section to an outline corresponding to an inner peripheral surface of the hollow portion changes along the peripheral direction of the shaft body, a second distance from the center of the cross section to an outline corresponding to the outer periphery of the shaft body changes along the peripheral direction of the shaft body.

In the hydrodynamic gas bearing in accordance with the present invention, the shaft body has such a hollow portion of the not-complete-round cross sectional shape as described above. Therefore, it is possible to control the shape of the outer periphery of the shaft body by processing the outer peripheral surface with a processing pressure being applied over the outer peripheral surface of the shaft body. More specifically, it is possible to control the shape of the outer peripheral surface of the shaft body such that as the first distance changes along the peripheral direction of the shaft body, the second distance changes. Therefore, outer periphery of the shaft body can be controlled in a simple manner at a low manufacturing cost. As a result, an outer peripheral surface of the shaft body which can suppress the half speed whirl phenomenon at a high speed rotation can be obtained.

Preferably, when the first distance represents a maximal value as its changes along the peripheral direction of the shaft body, the second distance represents a minimal value. In the hydrodynamic gas bearing in accordance with the present invention, preferably a recessed portion extending in the axial direction is formed partially or entirely at the outer peripheral portion of the shaft body corresponding to that range in which the first distance changes from the minimal value to the maximal value along the direction of air flow passing through the space.

Thus, it is possible to form a recessed portion on the outer peripheral surface of the shaft body having the not-complete-round cross sectional shape that attains a low floating rotational number and suppresses the half speed whirl phenomenon.

Therefore, it becomes possible to control the shape of the outer peripheral surface of the shaft body in a simple manner to effectively prevent the half speed whirl phenomenon and prevent wear at the time of starting or stopping rotation.

In the hydrodynamic gas bearing in accordance with the present invention, the hollow portion preferably has an approximately regular triangular or approximately square shape in the cross section vertical or perpendicular to the axial line of the shaft body.

In the method of manufacturing a hydrodynamic gas bearing in accordance with the present invention, by applying pressure on the outer peripheral surface of the shaft body having a hollow portion, the outer peripheral surface of the shaft body is processed so that the second distance changes in accordance with the change of the first distance. By such processing, the shape of the outer peripheral surface of the shaft body can be controlled in a simple manner, and hence a shaft body which can suppress the half speed whirl phenomenon can be obtained at a low manufacturing cost. Here, the effective pressure applied to the outer peripheral surface of the shaft body, that is, the processing pressure refers to such a pressure that causes deformation by at least 0.01 $\mu$m of the outer peripheral surface of the shaft body.

In the method of manufacturing the hydrodynamic gas bearing in accordance with the present invention, after the outer peripheral surface of the shaft body is processed so that the second distance changes in accordance with the change of the first distance by applying pressure on the outer peripheral surface of the shaft body having a hollow portion, the above described recessed or grooved portion is formed at a portion of the outer periphery of the shaft body. In this manner, after the outer peripheral shape of the shaft body is controlled to prevent the half speed whirl phenomenon, the position of the recessed portion, that is, the longitudinal groove can be controlled with the hollow portion having not-complete-round cross sectional shape as a reference. Therefore, the shaft body, which can prevent the half speed whirl phenomenon, suppress increase in the floating rotational number and prevent wear at the start or stop of rotation, can be manufactured in a simple manner.

As described above, according to the present invention, as a shaft body having a hollow portion of a prescribed not-complete-round cross sectional shape is used, the half speed whirl phenomenon at the time of high speed rotation can effectively be suppressed and rotational accuracy can be improved. Further, a hydrodynamic gas bearing having a shaft body which can effectively suppress the half speed whirl phenomenon at the time of high speed rotation can be provided at a low manufacturing cost. Further, by forming a recessed portion, that is, a longitudinal groove on an outer peripheral surface of the shaft body using the hollow portion of the not-complete-round cross sectional shape defined by the present invention as a reference, the floating rotational number can be reduced, wear at the start or stop of rotation can be prevented and as a result, a hydrodynamic gas bearing having longer life can be provided at a low manufacturing cost.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
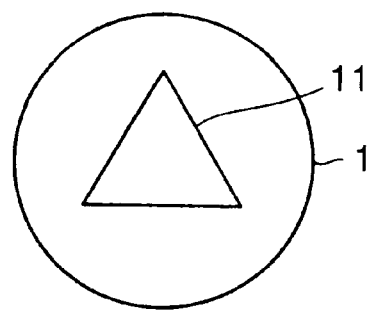
FIGS. 1A, 1B and 1C are cross sectional views showing in order the steps of manufacturing the shaft body of the hydrodynamic gas bearing in accordance with the present invention.
Figure 1B:
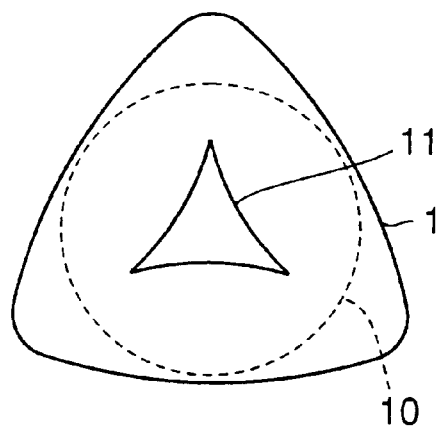
Figure 1C:
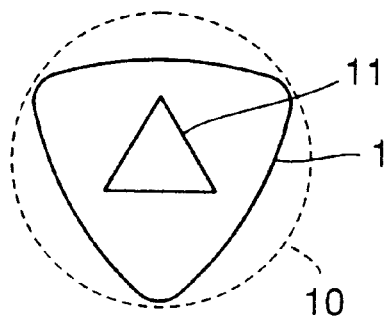

FIGS. 1A to 1C are cross sectional views showing, in an emphasized manner, one embodiment of the method of processing the outer peripheral surface of the shaft body in the hydrodynamic gas bearing in accordance with the present invention. Referring to FIG. 1A, shaft body 1 has a hollow portion 11 having an approximately regular triangular cross sectional shape as the hollow portion extending in the axial direction. Hollow portion 11 has a not-complete-round, line-symmetrical shape, symmetrical with respect to the line passing through the center of the cross section.

When the outer peripheral surface of the shaft body 1 is processed by using a lathe or the like, a prescribed processing pressure is applied over the outer peripheral surface of shaft body 1. Thus the cross sectional shape of the outer periphery of shaft body 1 deforms from complete round 10, as shown in FIG. 1B. Similarly, hollow portion 11 having approximately triangular cross section deforms as shown in FIG. 1B.

As the processing proceeds with the processing pressure being applied to the outer periphery of the shaft body using a lathe or the like, the processing proceeds so that the cross sectional shape of the outer periphery of the shaft body comes to be complete-round with the cross sectional shape of the shaft body being deformed as shown in FIG. 1B. As a result, that portion of the outer periphery of the shaft body corresponding to the vertex of the approximately regular triangle defining the cross sectional shape of hollow portion 11 is much processed. After processing, when the application of the pressure is released, the portion of the outer periphery of shaft body 1 corresponding to the protruded portion of the approximately regular triangle of hollow portion 11 has such a recessed shape as shown in FIG. 1C. In this manner, as the shaft body has a hollow portion extending in the axial direction and having a not-completely-round symmetrical shape with respect to the line passing through the center of the cross section, such as an approximately regular triangle, it is possible to provide such cross sectional shape of the outer periphery of the shaft body that can prevent the half speed whirl, by utilizing a simple method of processing such as with a lathe.

The out-of-roundness which represents deviation from complete round of the cross sectional shape of the outer periphery of the shaft body 1 can be appropriately controlled by adjusting process conditions such as the size of the hollow portion and the processing pressure. The processing method described above is similar to the conventional method except that the shaft body having a hollow portion of a line-symmetrical, not-complete-round shape is used. Therefore, processing of the shaft body which can prevent the half speed whirl phenomenon in accordance with the present invention does not cause any increase in manufacturing cost.

Figure 2:
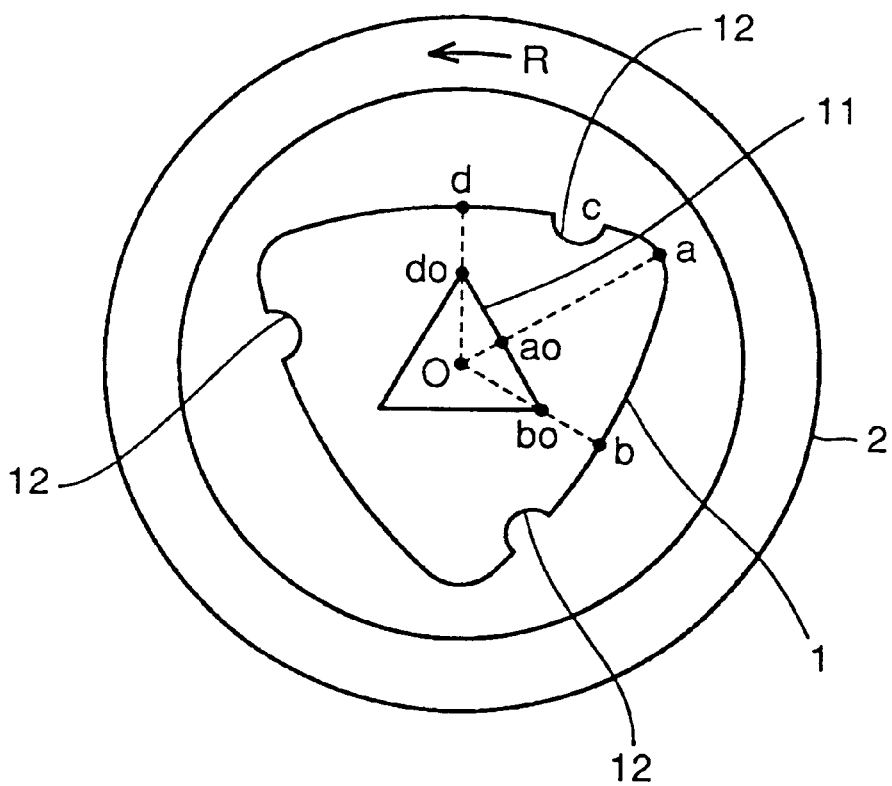
FIG. 2 is a cross sectional view showing an embodiment of the hydrodynamic gas bearing in accordance with the present invention.

FIG. 2 is a cross sectional view representing one embodiment of the hydrodynamic gas bearing in accordance with the present invention in which the shaft body has a hollow portion of which cross section is an approximately regular triangle, and longitudinal grooves are formed at prescribed positions on the outer periphery of the shaft body. it should be noted that as in FIG. 1, the outline representing the outer periphery of shaft body 1 is drawn considerably out of complete round in an emphasized manner for easier understanding, in FIG. 2. Referring to FIG. 2, shaft body 1 has a hollow portion 11. Hollow portion 11 has a cross sectional shape of an approximately regular triangle. The first distance from the center O of the cross section of shaft body 1 to points $b_0$, $a_0$ and $d_0$ on the outline corresponding to the inner periphery of hollow portion 11 changes along the peripheral direction of shaft body 1. More specifically, the first distance decreases from the length of $Ob_0$ to $Oa_0$, and then increases to the length $Od_0$. Here, the first distance has the maximal value at the length $Ob_0$ or $Od_0$, and hence a minimal value $Oa_0$. As the first distance changes, the second distance from the center O of the cross section of shaft body 1 to points b, a and d on the outline corresponding to the outer periphery of shaft body 1 changes along the peripheral direction of shaft body 1. More specifically, the second distance increases from Ob to Oa and decreases to Od. Here, the second distance has the minimal value Ob or Od and has a maximal value Oa, as it changes along the peripheral direction of shaft body 1.

In the hydrodynamic gas bearing shown in FIG. 2, a cylindrical bearing body 2 is placed around the outer peripheral surface of shaft body 1 with a space maintained therebetween in the radial direction. Assume that bearing body 2 rotates in the direction of the arrow R, as shown in FIG. 2. More specifically, by the rotation, air flow is caused in the same direction as represented by the arrow R in the space between shaft body 1 and bearing body 2. Longitudinal grooves 12 are formed on the outer peripheral surface of shaft body 1. Longitudinal grooves 12 are formed at positions represented by c on the outer periphery of shaft body 1. More specifically, each longitudinal groove 12 is formed as a recessed portion extending in the direction of the axial line at a portion c of the outer periphery of shaft body 1 in that range in which the first distance changes from the minimal value, that is, the length $Oa_0$ to the maximal value, that is, the length $OD_0$. As the position on the outer periphery of shaft body 1 at which the longitudinal groove 12 is to be formed is determined with the shape of hollow portion 11 used as a reference, it becomes possible to suppress the half speed whirl phenomenon at the time of high speed rotation, and in addition, it becomes possible to control the position of forming the longitudinal grooves with respect to the outer shape of the outer periphery of the shaft body so as to suppress the floating rotational number to a low number.

Figure 8:
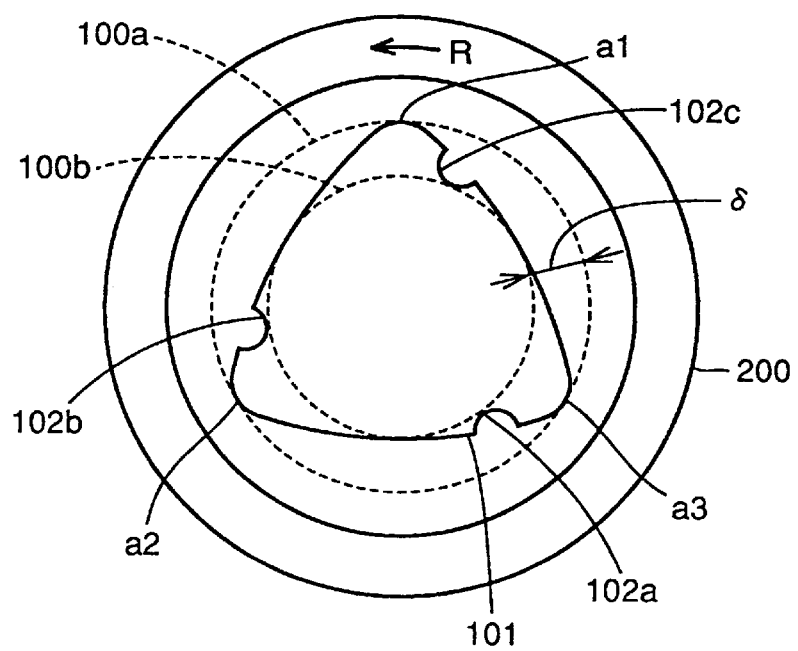
FIG. 8 is a schematic cross section representing a conventional hydrodynamic gas bearing structure.

In the hydrodynamic gas bearing shown in FIG. 2, when the bearing body 2 is rotated in the direction of the arrow R, the half speed whirl phenomenon at the time of high speed rotation can be suppressed and the floating rotational number can be suppressed to a low number. It should be noted, however, that when bearing body 2 is rotated in the direction opposite to the direction of the arrow R, the floating rotational number increases. More specifically, the positional relation of longitudinal groove 12 to the triangular inner periphery of the shaft body 1, shown in FIG. 2, is opposite to the positional relation of longitudinal grooves 102a, 102b and 102c of the conventional example shown in FIG. 8.

According to the present invention, as can be seen from FIG. 2, the shape of the outer periphery of the shaft body and the positions of the longitudinal grooves can be controlled to attain both suppression of the half speed whirl phenomenon and a lower floating rotational number. Further, as the shape of the outer periphery of the shaft body is controlled in accordance with the present invention, the half speed whirl phenomenon at the time of high speed rotation can be so effectively suppressed that the depth and the width of the grooves contributing to lower floating rotational number can be made smaller. Therefore, degradation in stiffness of the shaft body resulting from the formation of grooves can be minimized.

Though the hollow portion having the approximately triangular cross sectional shape has been described above, similar functions and effects can be attained even when polygonal shapes other than the triangle are used, for example, approximately rectangular or approximately pentagonal shapes. Though the hollow portion has one polygonal cross sectional shape in the above described embodiment, the hollow portion may have a curved shape such as an ellipse. Though one hollow portion is formed in the shaft body in the above described embodiment, a plurality of hollow portions that are symmetrically aligned with respect to a line passing through the center of the cross section of the shaft body may be formed to attain the similar functions and effects, provided that the hollow portions as a whole provide not-completely-round cross sectional shape. For example, a plurality of hollow portions having approximately completely round cross sections may be formed arranged at equal space with respect to the center of the cross section of the shaft body.

In the above described embodiment, a method of processing using a lathe has been described as an example of the method of processing the outer periphery of the shaft body having the hollow portion. The outer periphery of the shaft body, however, may be processed by a centerless grinder or the like.

EXAMPLE 1

Figure 3:
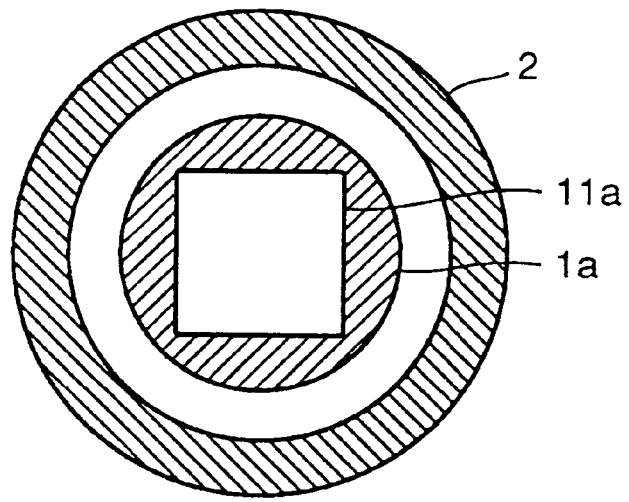
FIG. 3 is a cross sectional view representing the hydrodynamic gas bearing of the present invention used in Example 1.

Referring to FIG. 3, a material of a shaft body of stainless steel having an outer diameter of 16.0 mm, a hollow portion with a cross sectional shape of a square with each side being 9 mm (with the vertex chamfered with an arc of about 0.2 mm radius), and having a length of 50 mm was prepared. By using a lathe, a portion of the shaft body material of a length of 40 mm was processed so that the outer periphery came to have the outer diameter of 15.0 mm. A bearing body (mass: 250g) of stainless steel having the length of 35 mm was combined with the shaft body sample 1-A obtained in this manner, with a space in the radial direction between the bearing body and the outer peripheral surface of the shaft body being 5 μm. FIG. 3 shows a cross sectional shape of the thus obtained hydrodynamic gas bearing. As can be seen from FIG. 3, shaft body 1a has a hollow portion 11a. Bearing body 2 is arranged around shaft body 1a with a space therebetween. Exact outer peripheral shape such as out-of-roundness of shaft body 1a is not shown in FIG. 3.

Figure 4:
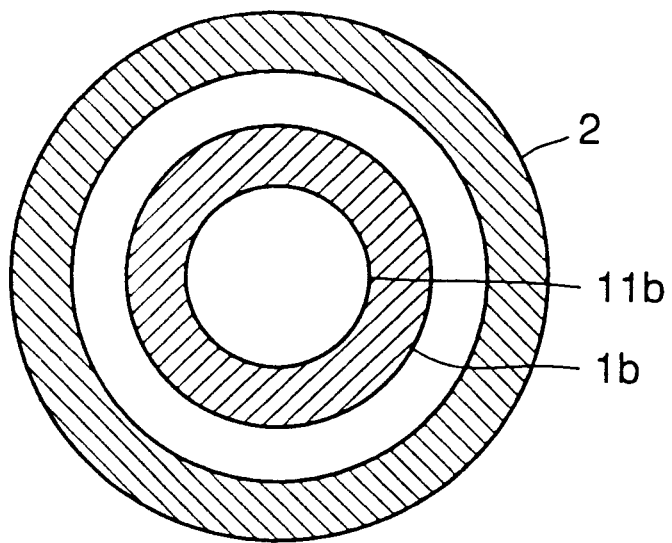
FIG. 4 is a cross sectional view of a hydrodynamic gas bearing as a comparative example for Example 1.

Similarly, a material of a shaft body having a hollow portion of which cross section is circular with the diameter of 9 mm was processed in the similar manner as sample 1-A, and thus shaft body sample 1-B was prepared. The bearing body was combined with the shaft body in the similar manner as sample 1-A, and a hydrodynamic gas bearing was formed. FIG. 4 shows the cross sectional shape of the hydrodynamic gas bearing. As can be seen from FIG. 4, shaft body 1b has a hollow portion 11b. Bearing body 2 is placed with a prescribed space from the outer peripheral surface of shaft body 1b. FIG. 4 does not show the exact shape of the outer peripheral surface and the out-of-roundness of shaft body 1b, either.

A rotation test was performed on the hydrodynamic gas bearings structured as described above. The rotation test was performed by rotating bearing body 2 with respect to shaft bodies 1a and 1b, respectively. The bearing body 2 was floated with respect to shaft body 1a or 1b in the axial direction, by means of a permanent magnet. In the rotation test, the floating rotational number and the ratio of occurrence of the half speed whirl phenomenon at the rotation number of 5000 rpm and 15000 rpm (among 10 samples) were studied. Outer diameter and out-of-roundness of shaft bodies 1a and 1b were measured for samples 1-A and 1-B.

The results of measurements are as shown in Table 1.

TABLE 1

| Sample Name | Hollow Portion | Outer Diameter (mm) | Out-of-roundness (μm) | Floating Rotational Number (rpm) | Half Speed Whirl Ratio (%) 5000 rpm | Half Speed Whirl Ratio (%) 15000 rpm | Remarks |
|---|---|---|---|---|---|---|---|
| 1-A | Square (side 9 mm) | 15.0 | 0.6 | 500 | 0 | 10 | Present Invention |
| 1-B | Circle (diameter 9 mm) | 15.0 | 0.2 | 500 | 10 | 60 | Comparative Example |

As a result of measurement of out-of-roundness, a pattern without any significant tendency was observed on sample 1-B, while the tendency that the portion of the outer periphery of the shaft body corresponding to that vertex of the square of the cross section of the hollow portion is recessed for complete roundness was apparent in sample 1-A. As is apparent from Table 1, when the shaft body sample 1-A having the hollow portion of which cross section is not-complete-round but square is used, the half speed whirl phenomenon at the time of high speed rotation can be suppressed as compared with when sample 1-B was used.

EXAMPLE 2

A material of a shaft body of silicon nitride ceramics having an outer diameter of 8.4 mm, a hollow portion of which cross sectional shape is a regular triangle with its side being 4.5 mm (with the vertex chamfered with an arc of about 0.2 mm radius) and a length of 30 mm was prepared. Using a centerless grinder, the shaft body material was processed so that the outer periphery thereof came to have the outer diameter of 8.0 mm, and thus a shaft body sample 2-A was fabricated.

Figure 5:
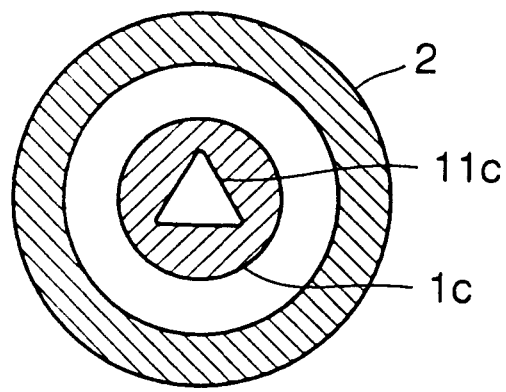
FIG. 5 is a cross sectional view representing a hydrodynamic gas bearing of the present invention in accordance with Example 2.
Figure 6:
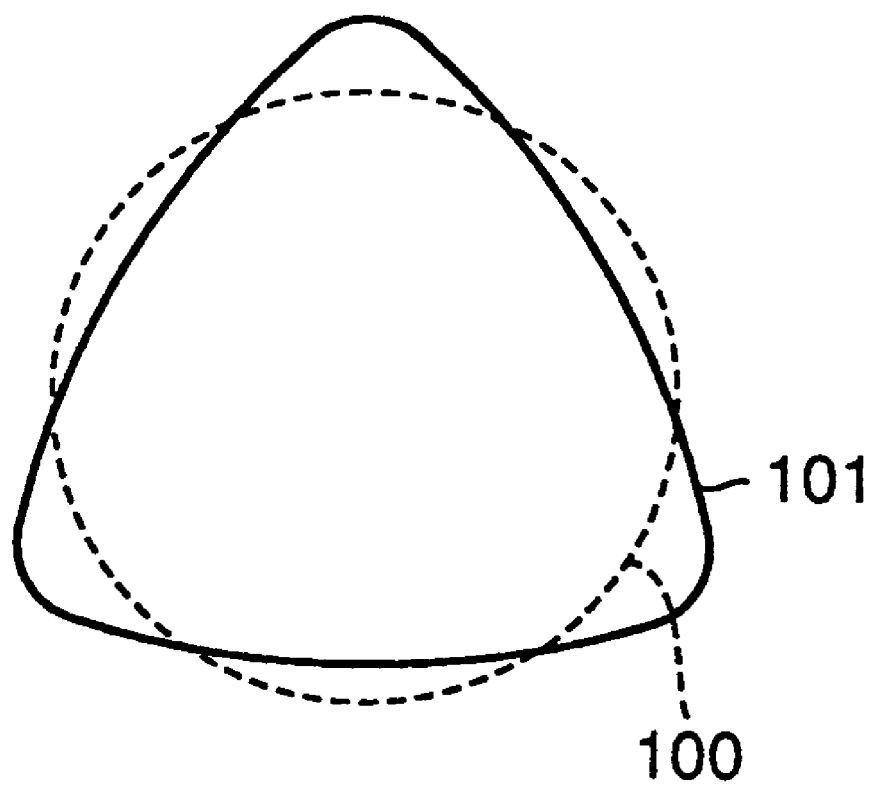
FIG. 6 is a cross sectional view showing the shape of the outer periphery of the shaft body used in the conventional hydrodynamic gas bearing.
Figure 7:
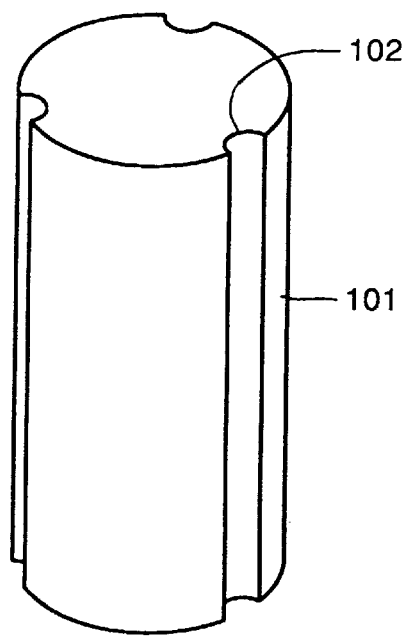
FIG. 7 is a perspective view showing an exemplary shaft body having longitudinal grooves formed on the outer periphery, used in the conventional hydrodynamic gas bearing.

The outer diameter and the out-of-roundness of the obtained sample 2-A were measured. A bearing body (mass= 50g) of silicon nitride ceramics having the length of 20 mm was combined with the shaft body with the space in the radial direction between the outer peripheral surface of the shaft body and the bearing body being 2.5 µm, thus a hydrodynamic gas bearing was formed. FIG. 5 shows the cross section of the hydrodynamic gas bearing structured in this manner. As can be seen from FIG. 5, shaft body 1c has a hollow portion 11c. The bearing body 2 is placed around the outer periphery of shaft body 1c. FIG. 5 does not show the exact shape of the outer peripheral surface and the out-of-roundness of shaft body 1c.

Similarly, a material of a solid shaft body not having the hollow portion was processed to fabricate a shaft body sample 2-B, which 5 was combined with the similar bearing body as described above to form a hydrodynamic gas bearing.

A rotation test was performed on the bearing bodies and the two shaft body samples 2-A and 2-B prepared in this manner. In the hydrodynamic gas bearings, the bearing body was floated with respect to the shaft body in the axial direction by means of a permanent magnet, as in Example 1. Rotation test was performed by rotating the bearing body with respect to the shaft body.

As a result of measurement of the out-of-roundness, a pattern without any significant tendency was observed on the shaft body 2-B. The shaft body sample 2-A had a tendency that the portion of the outer periphery of the shaft body which corresponds to the vertex of a regular triangle of the cross section of the hollow portion is recessed. The tendency was not so apparent with the difference between recess and protruded portions being small.

It was found through analysis of the results of measurement of the surface shape by fast Fourier transform (FFT) that there were clearly three peaks in the peripheral direction corresponding to the vertexes of the regular triangle of the cross section of the hollow portion, in other words, the cross sectional shape of the outer periphery of the shaft body is approximately triangular with corners rounded.

Based on the shaft body sample 2-A, a sample 2-AM was fabricated by forming a groove 12 at a position just in the middle between the points a and d on the outer periphery of shaft body 1 as shown in FIG. 2. The longitudinal groove was processed by a grinder on an outer peripheral surface of the shaft body sample parallel to the axial line, with the cutting depth of 5 µm. Further, similar processing was performed on the outer peripheral surface of the shaft body with the cutting depth of 5 µm, with the shaft body rotated by 4° at the central angle. In this manner, a shaft body having such a cross section as shown in FIG. 2 was obtained.

Based on the sample 2-B, similar longitudinal grooves were processed on the outer peripheral surface and sample 2-BM was obtained. Different from the sample 2-AM, the shaft body sample 2-BM did not have any hollow portion, and therefore there was no reference for forming the grooves. Accordingly, grooves were formed at arbitrary positions. Using the shaft body samples 2-AM and 2-BM, hydrodynamic gas bearings were formed in the similar manner as described above and similar rotation test was performed.

The results of measurements are shown in Table 2.

TABLE 2

| Sample Name | Hollow Portion | Outer Diameter (mm) | Out-of-Roundness (µm) | Longitudinal Groove | Rotational Direction | Floating Rotational Number | | Half Speed Whirl Ratio (%) | | Remarks |
| --- | --- | --- | --- | --- | --- | --- | --- | --- | --- | --- |
| | | | | | | Average (rpm) | >1000 rpm Ratio (%) | 10000 rpm | 25000 rpm | |
| 2-A | Triangle (side 4.5 mm) | 8.0 | 0.19 | Not provided | Left | 260 | 0 | 0 | 5 | Present Invention |
| | | | | | Right | 240 | 0 | 0 | 10 | Present Invention |
| 2-AM | Triangle (side 4.5 mm) | 8.0 | 0.19 | Provided | Left | 300 | 0 | 0 | 0 | Present Invention |
| | | | | | Right | 1700 | 40 | 0 | 0 | Comparative Example |
| 2-B | Not provided | 8.0 | 0.17 | Not Provided | Left | 250 | 0 | 5 | 40 | Comparative Example |
| | | | | | Right | 260 | 0 | 10 | 50 | Comparative Example |
| 2-BM | Not provided | 8.0 | — | Provided | Left | 550 | 10 | 0 | 0 | Comparative Example |
| | | | | | Right | 600 | 5 | 0 | 0 | Comparative Example |

In the rotation test, the floating rotational number in both left and right directions of rotation, and the ratio of occurrence of the half speed whirl phenomenon (among 20 samples) at the rotation number of 1000 rpm and 25000 rpm were studied.

It is known that the combination of the materials of the shaft body and the bearing body in the example above suffers only slight wear even after repeated activation/stopping of 100,000 times provided that the floating rotational number is at most 1000 rpm. Therefore, wear at the start and stop of rotation can be effectively suppressed if the floating rotational number can be suppressed to at most 1000 rpm.

As is apparent from the result of measurement of Table 2, when the shaft body having the hollow portion of sample 2-A is used, the half speed whirl phenomenon can effectively be suppressed. Further, when the shaft body with longitudinal grooves of sample 2-AM is used, the half speed whirl phenomenon at the time of high speed operation can be suppressed, the floating rotational number can be decreased especially when the bearing body is rotated in is the left direction and the wear at the start or stop of rotation can effectively be suppressed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A hydrodynamic gas bearing, comprising:
    a shaft body having an outer periphery, a peripheral direction extending around said outer periphery, and an axial direction extending along an axis of said shaft body, and a cylindrical bearing body arranged around the shaft body with a space therebetween in a radial direction; wherein
    said shaft body has a hollow portion extending in said axial direction and defining an inner periphery of said shaft body,
    in a cross section perpendicular to said axis of said shaft body, said hollow portion having a not-complete-round, symmetrical shape with respect to a line passing through a center of said cross section, and wherein
    as a first distance from the center of said cross section to said inner periphery of said hollow portion changes along said peripheral direction of said shaft body, a second distance from the center of said cross section to said outer periphery of shaft body changes along the peripheral direction of said shaft body.

2. The hydrodynamic gas bearing according to claim 1, wherein when said first distance represents a maximal value as it changes along said peripheral direction of said shaft body, said second distance represents a minimal value.

3. The hydrodynamic gas bearing according to claim 2, wherein a recessed longitudinal groove extending in said axial direction is formed partially or entirely at a portion of said outer periphery of said shaft body corresponding to a range where said first distance changes from a minimal value to said maximal value along a direction of air flow flowing through said space.

4. The hydrodynamic gas bearing according to claim 1, wherein said hollow portion has an approximately regular triangular shape in said cross section.

5. The hydrodynamic gas bearing according to claim 2, wherein said hollow portion has an approximately regular triangular shape in said cross section.

6. The hydrodynamic gas bearing according to claim 3, wherein said hollow portion has an approximately regular triangular shape in said cross section.

7. The hydrodynamic gas bearing according to claim 1, wherein said hollow portion has an approximately square shape in said cross section.

8. The hydrodynamic gas bearing according to claim 2, wherein said hollow portion has an approximately square shape in said cross section.

9. The hydrodynamic gas bearing according to claim 3, wherein said hollow portion has an approximately square shape in said cross section.

* * * * *